United States Patent
Epping et al.

(10) Patent No.: US 11,556,368 B2
(45) Date of Patent: Jan. 17, 2023

(54) TECHNIQUES FOR IMPLEMENTING VIRTUAL MACHINE (VM) COMPUTE TO STORAGE OBJECT PROXIMITY

(71) Applicant: VMware, Inc., Palo Alto, CA (US)

(72) Inventors: Duncan Epping, Helmond (NL); Frank Denneman, Purmerend (NL); Cormac Hogan, Cork (IE)

(73) Assignee: VMWARE, INC., Palo Alto, CA (US)

( * ) Notice: Subject to any disclaimer, the term of this patent is extended or adjusted under 35 U.S.C. 154(b) by 345 days.

(21) Appl. No.: 16/601,190

(22) Filed: Oct. 14, 2019

(65) Prior Publication Data

US 2021/0109773 A1 Apr. 15, 2021

(51) Int. Cl.
*G06F 9/455* (2018.01)
*G06F 3/06* (2006.01)

(52) U.S. Cl.
CPC ........ *G06F 9/45558* (2013.01); *G06F 3/0604* (2013.01); *G06F 3/065* (2013.01); *G06F 3/067* (2013.01); *G06F 2009/4557* (2013.01); *G06F 2009/45579* (2013.01)

(58) Field of Classification Search
None
See application file for complete search history.

(56) References Cited

U.S. PATENT DOCUMENTS

| | | | | |
|---|---|---|---|---|
| 8,898,508 B2 * | 11/2014 | Mummidi | ........... | G06F 11/2097 714/4.11 |
| 8,898,509 B2 * | 11/2014 | Mummidi | ............... | G06F 16/21 714/4.11 |
| 8,898,518 B2 * | 11/2014 | Agesen | ............... | G06F 11/2097 714/13 |
| 8,924,967 B2 * | 12/2014 | Nelson | ................ | G06F 9/45533 718/1 |
| 9,292,376 B2 * | 3/2016 | Ren | ........................ | G06F 11/301 |
| 9,851,906 B2 * | 12/2017 | Sarkar | ................... | G06F 3/0617 |
| 10,423,455 B2 * | 9/2019 | Bianchini | ............. | G06F 9/5072 |
| 10,873,638 B2 * | 12/2020 | Nayak | ...................... | H04L 67/16 |
| 10,951,479 B1 * | 3/2021 | Gupta | .................... | H04L 47/125 |
| 2016/0371020 A1 * | 12/2016 | Sarkar | ..................... | G06F 3/067 |
| 2017/0289005 A1 * | 10/2017 | Zheng | ................. | H04L 43/0817 |
| 2018/0262563 A1 * | 9/2018 | Mohammed | ........ | H04L 67/1097 |

* cited by examiner

*Primary Examiner* — Van H Nguyen

(57) ABSTRACT

In one set of embodiments, a computer system can analyze a layout of one or more storage objects of a VM to be placed within a cluster of host systems of a hyper-converged infrastructure (HCI) deployment. The computer system can further determine, based on the analyzing, that the one or more storage objects are stored on a single host system or within a single fault domain of the cluster. The computer system can then cause the VM to be placed on that single host system or within that single fault domain.

21 Claims, 9 Drawing Sheets

TECHNIQUES FOR IMPLEMENTING VIRTUAL MACHINE (VM) COMPUTE TO STORAGE OBJECT PROXIMITY

BACKGROUND

In a hyper-converged infrastructure (HCI) deployment comprising a cluster of host systems, persistent data associated with the cluster's virtual machines (VMs) is maintained in the form of storage objects that are stored on the local storage resources (e.g., directly-attached solid-state disks, directly-attached magnetic disks, etc.) of the host systems. Depending on the cluster's configuration, some of these host systems may reside in different fault domains corresponding to different physical locations/sites.

When a VM is powered-on or migrated in such a cluster, the VM is designated to run (or in other words, is "placed") on a particular host system of the cluster. However, with existing HCI implementations, this VM placement operation generally does not consider the proximity of the VM to its associated storage objects. Thus, the VM may be placed on a host system or in a fault domain that is remote from its storage objects, resulting in suboptimal storage performance for the VM.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure are directed to techniques for implementing VM compute to storage object proximity in an HCI deployment. At a high level, these techniques involve automatically analyzing, at the time of placing a VM on a host system in the deployment's cluster, how the VM's associated storage object(s) are distributed (or in other words, "laid out") across the host systems of the cluster. This analysis can include, e.g., checking whether fault domains are configured within the cluster, where a "fault domain" is a user-defined grouping of host systems that share a common mode of failure (e.g., all host systems within a particular server rack, building, data center, etc.). This analysis can further include checking whether the VM's storage object(s) are replicated across fault domains (in the case where fault domains are configured) or whether the VM's storage object(s) are pinned to a host system (in the case where fault domains are not configured).

If the foregoing analysis indicates that the VM's storage object(s) reside on/within a single host system or fault domain, that host system/fault domain can be identified. The VM can then be placed on/within the identified host system/fault domain, thereby minimizing the latency experienced by the VM when performing storage operations and thus optimizing the VM's storage performance. These and other aspects of the present disclosure are described in further detail in the sections that follow.

2. Example HCI Deployment and Storage Object Layout Scenarios

Figure 1:
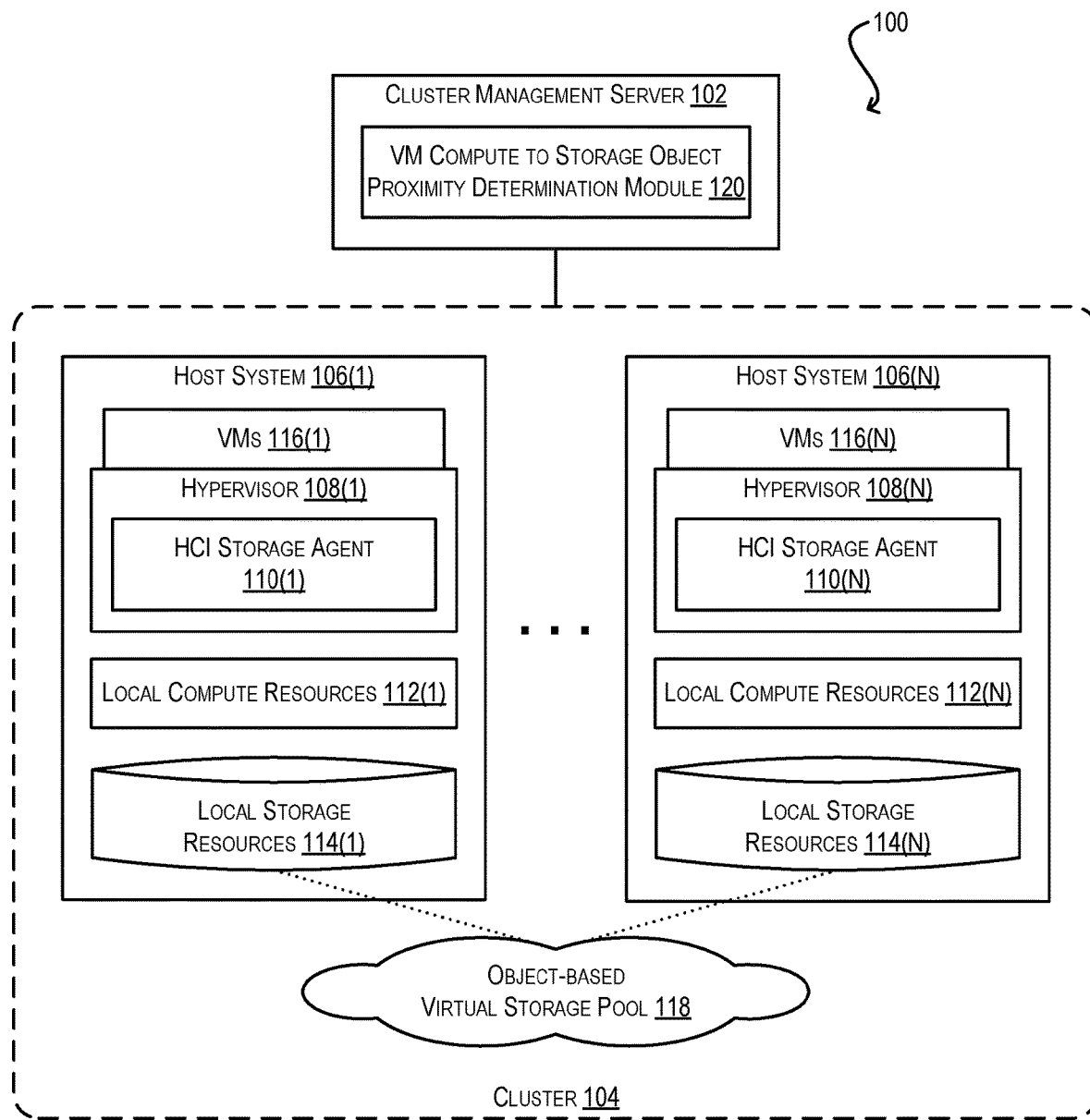
FIG. 1 depicts an example HCI deployment according to certain embodiments.

FIG. 1 is a simplified block diagram of an HCI deployment 100 that implements the techniques of the present disclosure according to certain embodiments. As shown, HCI deployment 100 includes a cluster management server 102 that is communicatively coupled with a cluster 104 of host systems 106(1)-(N). Each host system 106 comprises a hypervisor 108 with an HCI storage agent 110, a set of local compute resources 112 (e.g., central processing units (CPUs)), and a set of local storage resources 114 (e.g., directly-attached solid state disks, magnetic disks, non-volatile memory (NVM), etc.).

Hypervisors 108(1)-(N) are configured to virtualize the local compute resources of host systems 106(1)-(N) and allocate the virtualized compute resources to one or more locally running virtual machines (VMs) 116(1)-(N). Each VM, in turn, is configured to utilize the compute resources provided by its respective hypervisor to execute computing workloads (e.g., guest applications) via a guest operating system (OS) layer.

Figure 2:
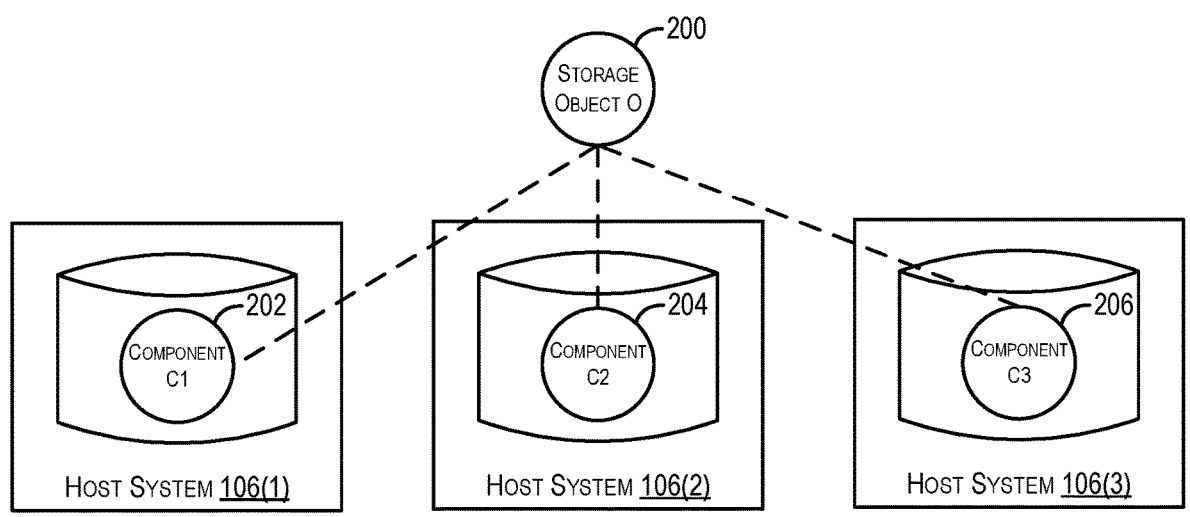
FIG. 2 depicts an example storage object according to certain embodiments.

HCI storage agents 110(1)-(N) residing within hypervisors 108(1)-(N) are configured to aggregate the local storage resources of host systems 106(1)-(N) into an object-based virtual storage pool 118 and make virtual storage pool 118 available to VMs 116(1)-(N) for data storage purposes. In this way, the persistent data used by VMs 116(1)-(N) can be maintained directly on host systems 106(1)-(N) rather than on separate, dedicated storage devices/arrays. The "object-based" qualifier for virtual storage pool 118 indicates that HCI storage agents 110(1)-(N) manage data in pool 118 in the form of storage objects. Each storage object is a logical data volume/container composed of one or more components, and each component can be understood as a sub-object that contains some portion of the data and/or metadata of the storage object. These components are distributed across the local storage resources of host systems 106(1)-(N) which form the physical storage layer of virtual storage pool 118. For example, FIG. 2 depicts the structure of a simple storage object O (reference numeral 200) according to an embodiment. In this example, storage object O is composed of three components C1 (reference numeral 202), C2 (reference numeral 204), and C3 (reference numeral 206) that are maintained on the local storage resources of host systems 106(1), 106(2), and 106(3) respectively.

Generally speaking, the manner in which the storage objects of VMs 116(1)-(N) (e.g., virtual disk (VMDK) objects, VM namespace objects, VM swap objects, etc.) are split into components and are laid out across host systems 106(1)-(N) of cluster 104 is influenced by two factors: (A) the fault domain configuration of the cluster and (B) failure tolerance parameter(s) specified for the storage objects within VM-level storage policies. As mentioned previously, a fault domain is a user-defined grouping of host systems that are deemed to share a common mode of failure (e.g., all host systems residing at the same physical location or site).

The following table lists four possible ways in which a VM's storage object may be laid out in accordance with various permutations of factors (A) and (B):

TABLE 1

| Layout scenario | Fault domains configured in cluster? | Failure tolerance parameters in VM-level storage policy | Resulting storage object layout |
|---|---|---|---|
| 1 | No | Storage object protection enabled via RAID-5 parity striping, RAID-6 parity striping, or RAID-1 mirroring (e.g., "failures to tolerate" or FTT parameter set to 1, 2, or 3 respectively) | At least two components stored on at least two different host systems of cluster |
| 2 | No | Storage object protection disabled; only single copy of object data needed (e.g., FTT parameter set to 0) | Single component stored on single host system of cluster |
| 3 | Yes | Storage object replication across fault domains enabled via RAID-1 mirroring (e.g., "primary failures to tolerate" or PFTT parameter set to 1) | One or more components replicated in every fault domain of cluster |
| 4 | Yes | Storage object replication across fault domains disabled (e.g., PFTT parameter set to 0) AND storage object protection within fault domains enabled via RAID-5 parity striping, RAID-6 parity striping, or RAID-1 mirroring (e.g., SFTT parameter set to 1, 2, or 3 respectively) | At least two components stored on at least two different host systems of a single fault domain (and no other fault domains) of cluster |

Figure 3A:
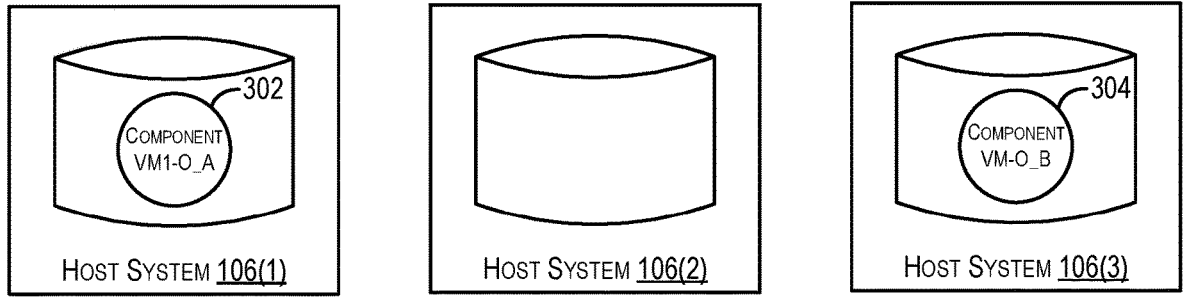
FIGS. 3A, 3B, 3C, and 3D depict example layout scenarios for a VM storage object according to certain embodiments.

FIGS. 3A, 3B, 3C, and 3D illustrate examples of each of the four layout scenarios above with respect to a storage object VM1-O of a virtual machine VM1 within cluster 104. In particular, FIG. 3A depicts an example 300 of layout scenario (1) where no fault domains are configured in cluster 104 and the storage policy for VM1 includes an FTT parameter of 1 (i.e., storage object protection enabled via RAID-1 mirroring). Accordingly, storage object VM1-O is composed of two mirrored components VM1-O_A (reference numeral 302) and VM1-O_B (reference numeral 304) that are stored on the local storage resources of host systems 106(1) and 106(3) respectively.

Figure 3B:
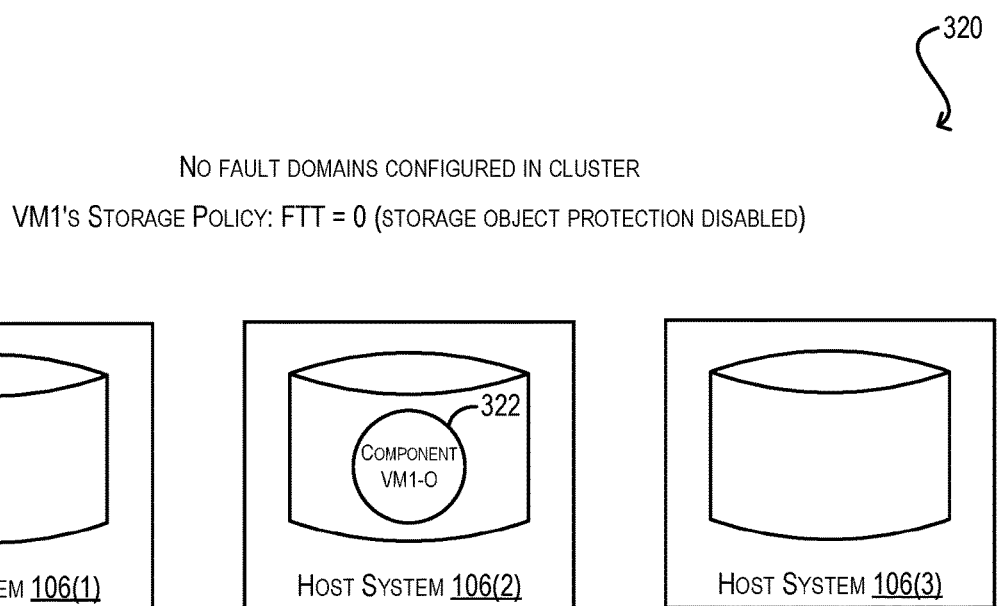

FIG. 3B depicts an example 320 of layout scenario (2) where no fault domains are configured in cluster 104 and the storage policy for VM1 includes an FTT parameter of 0 (i.e., storage object protection disabled; only single copy of data needed). Accordingly, storage object VM1-O is composed of a single component VM1-O (reference numeral 322) that is stored on the local storage resources of single host system 106(2).

Figure 3C:
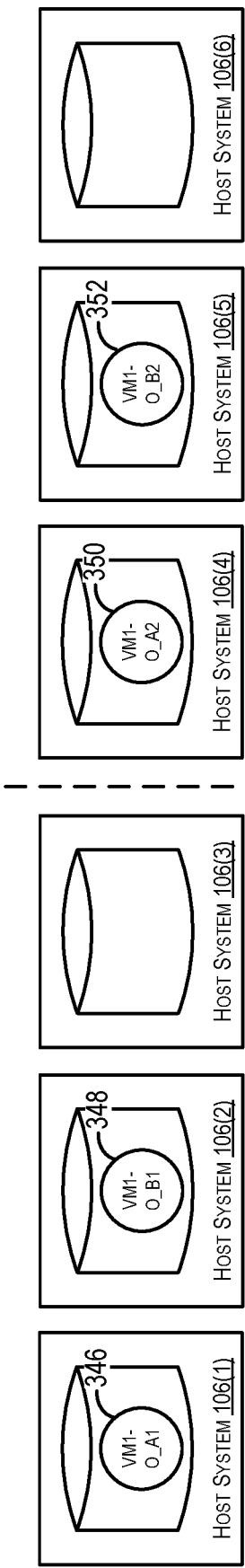

FIG. 3C depicts an example 340 of layout scenario (3) where two fault domains are configured in cluster 104 (a first fault domain 342 with host systems 106(1)-(3) and a second fault domain 344 with host systems 106(4)-(6)) and the storage policy for VM1 includes a PFTT parameter of 1 (i.e., storage object replication across fault domains enabled). It is also assumed that the storage policy includes an SFTT parameter of 1 (i.e., storage object protection within fault domains enabled via RAID-1 mirroring), although any other value for the SFTT parameter (e.g., 0, 2, or 3) may be used here. Accordingly, storage object VM1-O is composed of two mirrored components VM1-O_A1 (reference numeral 346) and VM1-O_B1 (reference numeral 348) within fault domain 342 that are stored on the local storage resources of host systems of 106(1) and 106(2) respectively, and another two mirrored components VM1-O_A2 (reference numeral 350) and VM1-O_B2 (reference numeral 352) within fault domain 344 that are stored on the local storage resources of host systems 106(4) and 106(5) respectively. In this example, VM1-O_A2 and VM1-O_B2 in fault domain 344 are replicas of VM1-O_A1 and VM1-O_B1 in fault domain 342.

Figure 3D:
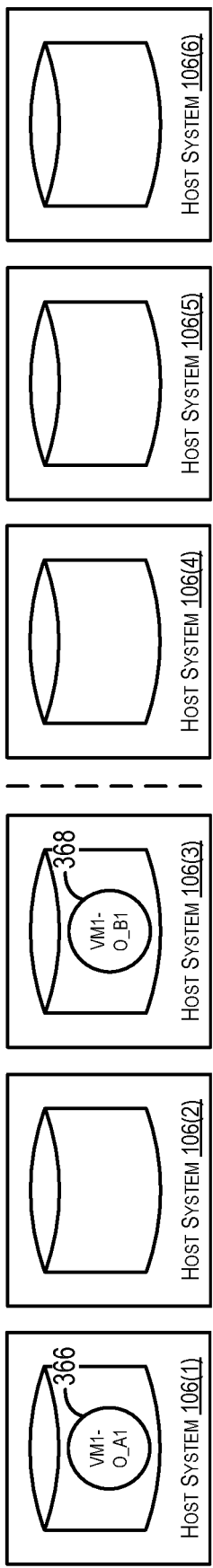

Finally, FIG. 3D depicts an example 360 of layout scenario (4) where two fault domains are configured in cluster 104 (a first fault domain 362 with host systems 106(1)-(3) and a second fault domain 364 with host systems 106(4)-(6)), the storage policy for VM1 includes a PFTT parameter of 0 (i.e., storage object replication across fault domains disabled), and the storage policy further includes an SFTT parameter of 1 (i.e., storage object protection within fault domains enabled via RAID-1 mirroring). Accordingly, storage object VM1-O is composed of two mirrored components VM1-O_A (reference numeral 366) and VM1-O_B (reference numeral 368) that reside solely within fault domain 362 on the local storage resources of host systems 106(1) and 106(3) respectively.

As can be seen in example 320 of FIG. 3B (corresponding to layout scenario (2) of Table 1), the entirety of VM1-O is stored on a single host system (i.e., 106(2)). Thus, in this scenario it would be desirable to place VM1 on that same host system for compute purposes, because such a placement would avoid the need for VM1 to traverse any inter-host network links in order to access VM1-O as part of its runtime operation.

Further, as can be seen in example 360 of FIG. 3D (corresponding to layout scenario (4) of Table 1), the entirety of VM1-O is stored across various host systems within a single fault domain (i.e., 362). Thus, in this scenario it would be desirable to place VM1 on a host system within that same fault domain for compute purposes, because the latency incurred by VM1 in accessing VM1-O within a single fault domain (which will likely comprise host systems residing at the same physical location/site) will typically be lower than the latency incurred in accessing VM1-O across different fault domains (which will likely comprise host systems residing at different physical locations/sites).

However, as noted in the Background section, existing HCI implementations generally do not take into the account the proximity of a VM to its storage object(s) at the time of placing the VM on a particular host system. Instead, when a VM is powered-on or migrated from one host system to another (for, e.g., load balancing purposes), the VM is placed without regard to the location(s) of its storage object(s). With respect to layout scenario (2) shown in FIG. 3B, this can lead to a situation where VM1 is placed on host system 106(1) or 106(3), rather than on host system 106(2) (i.e., the host system where storage object VM1-O resides). Further, with respect to layout scenario (4) shown in FIG. 3D, this can lead to a situation where VM1 is placed on a host system in fault domain 364, rather than on a host system in fault domain 362 (i.e., the fault domain where storage object VM1-O resides). Both of these outcomes can result in increased latency, and thus reduced performance, for VM1 when accessing VM1-O.

To address the foregoing and other similar issues, cluster management server 102 of FIG. 1 is enhanced to include a novel VM compute to storage object proximity determination module 120 (hereafter referred to as simply "proximity determinator" 120). As described in further detail below, when cluster management server 102 is tasked with placing a VM on a host system 106 within cluster 104, proximity determinator 120 can analyze the layout of the storage object(s) used by/associated with the VM and determine whether those storage object(s) are maintained on a single host system of the cluster (as in layout scenario (2)) or within a single fault domain of the cluster (as in layout scenario (4)). If the answer to either of these questions is yes, proximity determinator 120 can identify that host system or fault domain and recommend placement of the VM on/within the identified host system/fault domain to cluster management server 102. Cluster management server 102 can then place the VM in accordance with the recommendation (thereby optimizing the storage performance of the VM), or at least consider the recommendation in combination with other placement factors/criteria.

It should be appreciated that FIGS. 1-3 are illustrative and not intended to limit embodiments of the present disclosure. For example, although proximity determinator 120 is shown in FIG. 1 as being a part of cluster management server 102, in alternative embodiments some or all of the functionality attributed to this module may be implemented on other entities in HCI deployment 100/cluster 104, such as on one or more of host systems 106(1)-(N). Further, depending on the HCI implementation, the storage object layout scenarios depicted in FIGS. 3A-D may include certain other object components and/or fault domains that are not specifically described (e.g., witness components and witness fault domains). One of ordinary skill in the art will recognize other variations, modifications, and alternatives.

3. VM Placement Workflow

Figure 4:
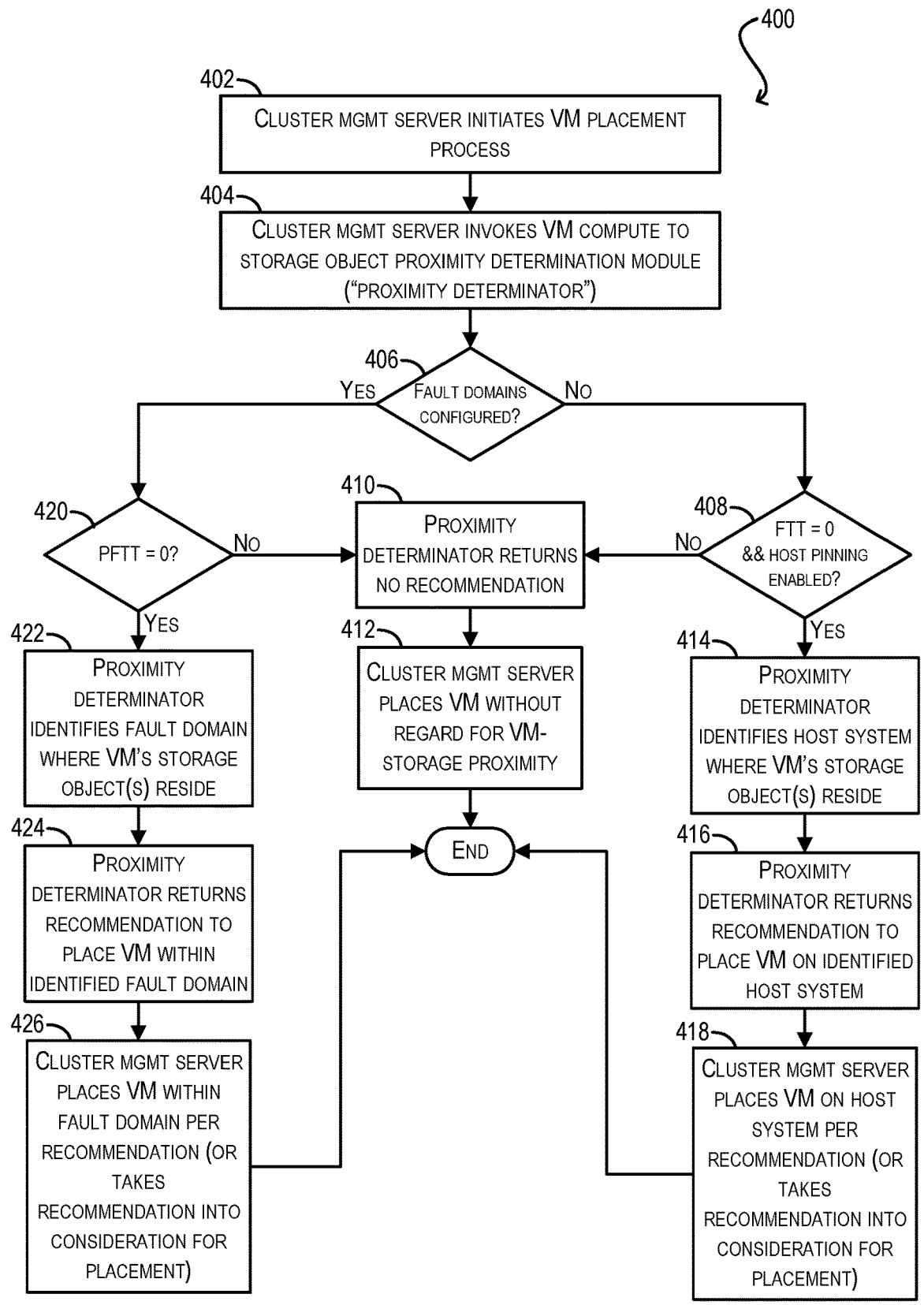
FIG. 4 depicts a VM placement workflow according to certain embodiments.

FIG. 4 depicts a workflow 400 that may be executed by cluster management server 102/proximity determinator 120 for placing a VM on a host system 106 of cluster 104 in a manner that takes into account the proximity of the VM to its storage object(s) in accordance with certain embodiments.

Starting with blocks 402 and 404, cluster management server 102 can initiate the process of placing the VM within cluster 104 (i.e., identifying and designating a host system on which the VM will run) and can invoke proximity determinator 102. In one set of embodiments, cluster management server 102 may initiate this process because the VM has been powered-on and thus needs to be placed on an initial host system. In another set of embodiments, cluster management server 102 may initiate this process because the server (or a module thereof) has determined that the host system where the VM is currently running has become overloaded and thus the VM needs to be migrated to another host system for load balancing purposes.

At block 406, proximity determinator 120 can check whether fault domains have been configured for cluster 104. If the answer at block 406 is no, proximity determinator 102 can further check whether (1) the VM's storage policy includes an FTT parameter of 0 (i.e., protection disabled for the VM's storage object(s)) and (2) host pinning is enabled for the VM (block 408). As used herein, "host pinning" is a VM-level configuration setting that, when enabled, causes all of the VM's storage object(s) to be allocated and stored on a single host system (rather than across multiple host systems). In various embodiments, host pinning can only be enabled if the VM's FTT parameter is set to 0, since an FTT parameter value of greater than 0 implies that the VM's storage object(s) must be distributed across at least two host systems for fault tolerance.

If the answer at block 408 is no, proximity determinator 120 can return no placement recommendation to cluster management server 102 (block 410), server 102 can proceed to place the VM on a host system of cluster 104 without regard for the VM's proximity to its storage object(s) (block 412), and the workflow can end.

However, if the answer at block 408 is yes, that implies the VM's storage object(s) are maintained on a single host system of the cluster (per layout scenario (2) described in Table 1 and shown in FIG. 3B). As a result, proximity determinator 120 can identify the specific host system where the VM's storage object(s) are stored (block 414) and return a recommendation to cluster management server 102 to place the VM on the identified host system (block 416). Cluster management server 102 can then place the VM on the identified host system per the recommendation, or at least take the recommendation into consideration in combination with potentially other placement criteria (e.g., host loads, VM compute requirements, VM host affinity settings, etc.) (block 418) and terminate the workflow.

Returning now to block 406, if proximity determinator 120 determines that fault domains are configured for cluster 104, determinator 120 can further check whether the VM's storage policy includes a PFTT parameter of 0 (i.e., storage object replication across fault domains disabled) (block 420). If the answer at block 420 is no, proximity determinator 120 can return no placement recommendation to cluster management server 102 and the server can proceed to place the VM without regard for the VM's proximity to its storage object(s) per blocks 410 and 412.

On the other hand, if the answer at block 420 is yes, that implies the VM's storage object(s) are maintained on one or more host systems within a single fault domain of cluster 104 (per layout scenario (4) described in Table 1 and shown in FIG. 3D). As a result, proximity determinator 120 can identify the specific fault domain where the VM's storage object(s) are stored (block 424) and return a recommendation to cluster management server 102 to place the VM on a host system within the identified fault domain (block 424). Cluster management server 102 can then place the VM within the identified fault domain per the recommendation, or at least take the recommendation into consideration in combination with potentially other placement criteria (block 426) and terminate the workflow.

Figure 5:
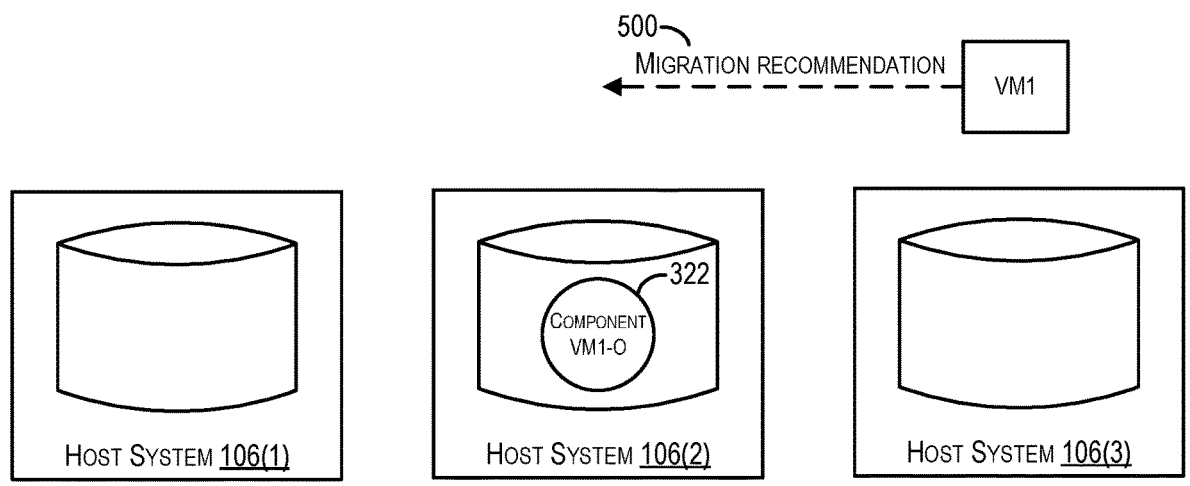
FIG. 5 depicts a result of applying the workflow of FIG. 4 to the storage object layout scenario of FIG. 3B according to certain embodiments.

To further clarify the processing presented in workflow 400, FIG. 5 depicts the result of applying this workflow in the context of the layout scenario for storage object VM1-O shown in FIG. 3B, under the assumption that VM1 was initially placed on host system 106(3). In this case, because the entirety of VM1's storage object VM1-O resides on host system 102(2), proximity determinator 120 will recommend migrating VM1 from host system 106(3) to host system 106(2) (shown via reference numeral 500), thereby aligning the host location of VM1 with the host location of its storage object.

Figure 6:
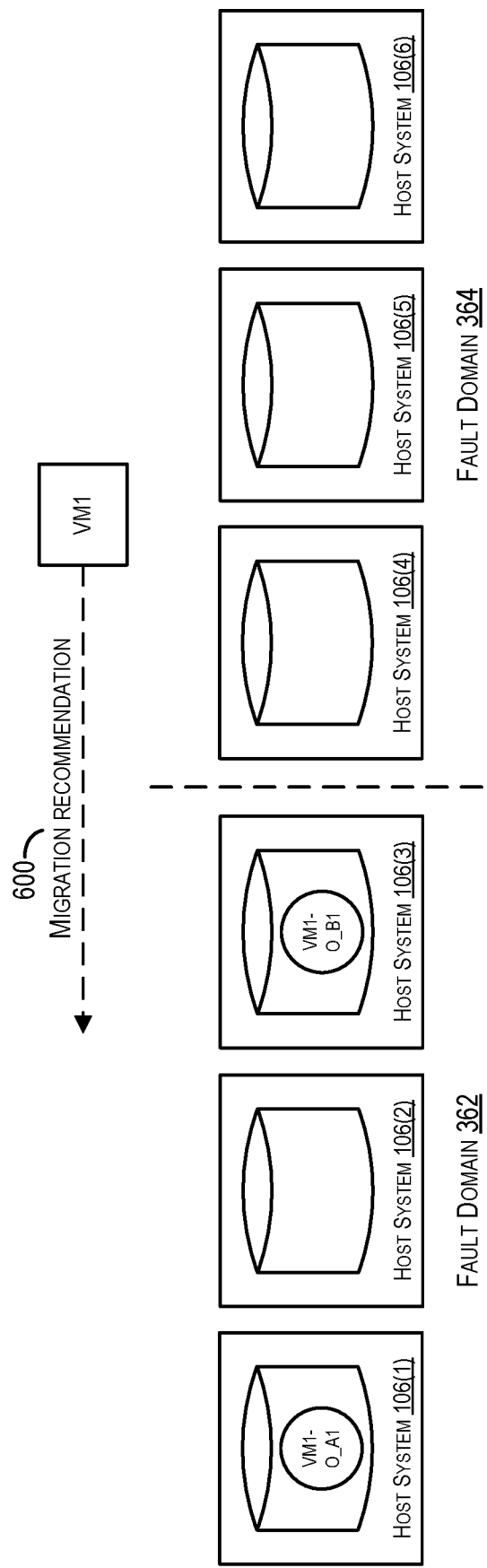
FIG. 6 depicts a result of applying the workflow of FIG. 4 to the storage object layout scenario of FIG. 3D according to certain embodiments.

Further, FIG. 6 depicts the result of applying workflow 400 in the context of the layout scenario for VM1-O shown in FIG. 3D, under the assumption that VM1 was initially placed on a host system within fault domain 364. In this case, because the entirety of VM1-O resides within fault domain 362, proximity determinator 120 will recommend migrating VM1 from fault domain 364 to 362, thereby aligning the fault domain location of VM1 with the fault domain location of its storage object.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general-purpose computer system selectively activated or configured by program code stored in the computer system. In particular, various general-purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device, based on any existing or subsequently developed technology, that can store data in a non-transitory state which can thereafter be input to or read by a computer system. Examples of non-transitory computer readable media include a hard drive, network attached storage (NAS), read-only memory, random-access memory, flash-based nonvolatile memory (e.g., a flash memory card or a solid-state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while certain virtualization methods referenced herein have generally assumed that virtual machines present interfaces consistent with a particular hardware system, persons of ordinary skill in the art will recognize that the methods referenced can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for implementing virtual machine (VM) compute to storage object proximity in a hyper-converged infrastructure (HCI) deployment comprising a cluster of host systems, the method comprising:
   analyzing, by a computer system, a layout of one or more storage objects of a VM to be placed within the cluster;
   determining, by the computer system based on the analyzing, that an entirety of the storage objects of the VM are stored on a single host system or within a single fault domain of the cluster; and
   in response to the determining, placing, by the computer system, the VM on the single host system or within the single fault domain.

2. The method of claim 1 wherein the analyzing comprises:
   determining whether two or more fault domains have been configured for the cluster, each fault domain representing a subset of host systems in the cluster that share a common mode of failure.

3. The method of claim 2 wherein if two or more fault domains have not been configured for the cluster, the analyzing further comprises:
   determining whether protection is enabled for the one or more storage objects within a storage policy of the VM; and
   determining whether host pinning is enabled for the VM.

4. The method of claim 3 wherein if protection is not enabled for the one or more storage objects and host pinning is enabled, the one or more storage objects of the VM are determined to be stored on the single host system.

5. The method of claim 2 wherein if two or more fault domains have been configured for the cluster, the analyzing further comprises:
   determining whether storage object replication across fault domains is enabled within a storage policy of the VM.

6. The method of claim 5 wherein if storage object replication across fault domains is enabled, the one or more storage objects of the VM are determined to be stored within the single fault domain.

7. The method of claim 1 wherein the analyzing is initiated either at a time of powering-on the VM or at a time of performing load balancing of VMs across the host systems of the cluster.

8. A non-transitory computer readable storage medium having stored thereon program code executable by a computer system, the program code embodying a method for implementing virtual machine (VM) compute to storage object proximity in a hyper-converged infrastructure (HCI) deployment comprising a cluster of host systems, the method comprising:

analyzing a layout of one or more storage objects of a VM to be placed within the cluster;

determining, based on the analyzing, that an entirety of the storage objects of the VM are stored on a single host system or within a single fault domain of the cluster; and in response to the determining, placing the VM on the single host system or within the single fault domain.

9. The non-transitory computer readable storage medium of claim 8 wherein the analyzing comprises:

determining whether two or more fault domains have been configured for the cluster, each fault domain representing a subset of host systems in the cluster that share a common mode of failure.

10. The non-transitory computer readable storage medium of claim 9 wherein if two or more fault domains have not been configured for the cluster, the analyzing further comprises:

determining whether protection is enabled for the one or more storage objects within a storage policy of the VM; and determining whether host pinning is enabled for the VM.

11. The non-transitory computer readable storage medium of claim 10 wherein if protection is not enabled for the one or more storage objects and host pinning is enabled, the one or more storage objects of the VM are determined to be stored on the single host system.

12. The non-transitory computer readable storage medium of claim 9 wherein if two or more fault domains have been configured for the cluster, the analyzing further comprises:

determining whether storage object replication across fault domains is enabled within a storage policy of the VM.

13. The non-transitory computer readable storage medium of claim 12 wherein if storage object replication across fault domains is enabled, the one or more storage objects of the VM are determined to be stored within the single fault domain.

14. The non-transitory computer readable storage medium of claim 8 wherein the analyzing is initiated either at a time of powering-on the VM or at a time of performing load balancing of VMs across the host systems of the cluster.

15. A computer system comprising:

a processor; and a non-transitory computer readable medium having stored thereon program code that, when executed, causes the processor to:

analyze a layout of one or more storage objects of a virtual machine (VM) to be placed within a cluster of host systems;

determine, based on the analyzing, that an entirety of the storage objects of the VM are stored on a single host system or within a single fault domain of the cluster; and in response to the determining, place the VM on the single host system or within the single fault domain.

16. The computer system of claim 15 wherein the program code that causes the processor to analyze the layout comprises program code that causes the processor to:

determine whether two or more fault domains have been configured for the cluster, each fault domain representing a subset of host systems in the cluster that share a common mode of failure.

17. The computer system of claim 16 wherein if two or more fault domains have not been configured for the cluster, the program code that causes the processor to analyze the layout further comprises program code that causes the processor to:

determine whether protection is enabled for the one or more storage objects within a storage policy of the VM; and determine whether host pinning is enabled for the VM.

18. The computer system of claim 17 wherein if protection is not enabled for the one or more storage objects and host pinning is enabled, the processor determines that the one or more storage objects of the VM are stored on the single host system.

19. The computer system of claim 16 wherein if two or more fault domains have been configured for the cluster, the program code that causes the processor to analyze the layout further comprises program code that causes the processor to:

determine whether storage object replication across fault domains is enabled within a storage policy of the VM.

20. The computer system of claim 19 wherein if storage object replication across fault domains is enabled, the processor determines that the one or more storage objects of the VM are stored within the single fault domain.

21. The computer system of claim 15 wherein the analyzing is initiated either at a time of powering-on the VM or at a time of performing load balancing of VMs across the host systems of the cluster.

* * * * *